US009792040B2

(12) United States Patent
Fitzmaurice et al.

(10) Patent No.: US 9,792,040 B2
(45) Date of Patent: Oct. 17, 2017

(54) PEN-MOUSE SYSTEM

(71) Applicant: AUTODESK, INC., San Rafael, CA (US)

(72) Inventors: George Fitzmaurice, Toronto (CA); Gordon Paul Kurtenbach, Toronto (CA); William A. Buxton, Toronto (CA); Robert J. Pieke, Richmond Hill (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 14/558,598

(22) Filed: Dec. 2, 2014

(65) Prior Publication Data

US 2015/0089437 A1 Mar. 26, 2015

Related U.S. Application Data

(63) Continuation of application No. 11/754,019, filed on May 25, 2007, now Pat. No. 8,904,310, which is a (Continued)

(51) Int. Cl.
*G06F 3/048* (2013.01)
*G06F 3/0488* (2013.01)
(Continued)

(52) U.S. Cl.
CPC ........ *G06F 3/04886* (2013.01); *G06F 3/0482* (2013.01); *G06F 3/0488* (2013.01);
(Continued)

(58) Field of Classification Search
CPC ........................... G06F 3/0481; G06F 3/04812
See application file for complete search history.

(56) References Cited

U.S. PATENT DOCUMENTS 4,720,703 A * 1/1988 Schnarel, Jr. ............ G09G 5/14 345/163
4,931,783 A 6/1990 Atkinson
(Continued)

OTHER PUBLICATIONS

Polital Enterprises, Point-N-Click virtual mouse, Dec. 1, 2001, pp. 1-8.*
(Continued)

*Primary Examiner* — Ryan Pitaro
(74) *Attorney, Agent, or Firm* — Artegis Law Group, LLP

(57) ABSTRACT

The disclosed pen-mouse is a tracking menu that tracks the position of the pen. A pen cursor that corresponds to the pen is moved about within the pen-mouse graphic by the pen and the pen-mouse remains stationary. The pen-mouse is moved when the location of the pen encounters a tracking boundary of the pen-mouse. The tracking boundary coincides with the graphic representing the mouse. While moving within the pen-mouse, the pen can select objects within the pen-mouse body, such as buttons, wheels, etc. The selection of a button or other virtual control causes a corresponding computer mouse button function to be executed. The execution is directed at any object designated by a pen-mouse tracking symbol, such as an arrow, that is part of the pen mouse graphic. The pen-mouse emulates functions or operations of a mouse including single button clicks, double button clicks, finger wheels, track balls, etc.

13 Claims, 15 Drawing Sheets

Related U.S. Application Data continuation of application No. 10/684,581, filed on Oct. 15, 2003, now Pat. No. 7,242,387.

(60) Provisional application No. 60/419,144, filed on Oct. 18, 2002.

(51) Int. Cl.
*G06F 3/0482* (2013.01)
*G06F 3/0484* (2013.01)
*G09G 5/08* (2006.01)
*G09G 5/14* (2006.01)

(52) U.S. Cl.
CPC ........... *G06F 3/04842* (2013.01); *G09G 5/08* (2013.01); *G09G 5/14* (2013.01)

(56) References Cited

U.S. PATENT DOCUMENTS

| | | | |
|---|---|---|---|
| 5,276,795 A | 1/1994 | Hoeber et al. | |
| 5,463,726 A * | 10/1995 | Price | G06F 3/0481 715/797 |
| 5,500,936 A | 3/1996 | Allen et al. | |
| 5,581,670 A | 12/1996 | Bier et al. | |
| 5,627,960 A | 5/1997 | Clifford et al. | |
| 5,634,064 A | 5/1997 | Warnock et al. | |
| 5,638,523 A | 6/1997 | Mullet et al. | |
| 5,655,093 A * | 8/1997 | Frid-Nielsen | G06F 3/04812 345/169 |
| 5,666,499 A | 9/1997 | Baudel et al. | |
| 5,689,667 A | 11/1997 | Kurtenbach | |
| 5,745,116 A * | 4/1998 | Pisutha-Arnond | G06F 3/04883 715/821 |
| 5,760,773 A | 6/1998 | Berman et al. | |
| 5,798,752 A | 8/1998 | Buxton et al. | |
| 5,828,360 A | 10/1998 | Anderson et al. | |
| 6,018,336 A * | 1/2000 | Akiyama | G06F 3/0414 345/173 |
| 6,037,937 A | 3/2000 | Beaton et al. | |
| 6,057,844 A | 5/2000 | Strauss | |
| 6,097,387 A | 8/2000 | Sciammarella et al. | |
| 6,118,427 A | 9/2000 | Buxton et al. | |
| 6,154,214 A | 11/2000 | Uyehara et al. | |
| 6,181,344 B1 | 1/2001 | Tarpenning et al. | |
| 6,204,845 B1 * | 3/2001 | Bates | G06F 3/0481 715/788 |
| 6,246,411 B1 | 6/2001 | Strauss | |
| 6,262,719 B1 | 7/2001 | Bi et al. | |
| 6,369,837 B1 | 4/2002 | Schirmer | |
| 6,549,219 B2 | 4/2003 | Selker | |
| 6,791,536 B2 * | 9/2004 | Keely | 345/161 |
| 6,865,719 B1 | 3/2005 | Nicholas, III | |
| 6,918,091 B2 | 7/2005 | Leavitt et al. | |
| 6,938,221 B2 * | 8/2005 | Nguyen | G06F 3/04883 345/173 |
| 7,058,902 B2 | 6/2006 | Iwema et al. | |
| 7,242,387 B2 | 7/2007 | Fitzmaurice et al. | |
| 7,319,454 B2 * | 1/2008 | Thacker | G06F 3/04883 345/163 |
| 7,395,515 B2 | 7/2008 | Konar et al. | |
| 7,477,233 B2 * | 1/2009 | Duncan | G06F 3/04883 178/18.01 |
| 7,565,628 B2 * | 7/2009 | Kim | G06F 3/0488 715/810 |
| 7,770,135 B2 | 8/2010 | Fitzmaurice | |
| 7,814,439 B2 | 10/2010 | Fitzmaurice et al. | |
| 8,013,837 B1 * | 9/2011 | Schroeder | G06F 3/011 345/157 |
| 2001/0009428 A1 | 7/2001 | Dow et al. | |
| 2002/0085037 A1 | 7/2002 | Leavitt et al. | |
| 2002/0101458 A1 | 8/2002 | SanGiovanni | |
| 2002/0122029 A1 * | 9/2002 | Murphy | G06F 3/041 345/173 |
| 2002/0175955 A1 | 11/2002 | Gourdol et al. | |
| 2002/0186351 A1 * | 12/2002 | Gnanamgari | G06F 3/0386 353/42 |
| 2005/0179645 A1 | 8/2005 | Lin et al. | |
| 2006/0010402 A1 * | 1/2006 | Undasan | G06F 3/0481 715/861 |
| 2009/0100366 A1 | 4/2009 | Fitzmaurice et al. | |

OTHER PUBLICATIONS

Accot, et al., "More than dotting the I's—foundations for crossing-based interfaces", Proceedings of ACM CHI 2002, pp. 73-80.

Adobe Photoshop 5, pp. 1-2, published 1998.

Bederson, et al., "Pad++: A Zooming Graphical Interface for Exploring Alternative Interface Physics", Proceedings of ACM UIST 1994, pp. 17-26.

Bier, et al., "A Taxonomy of See Through Tools", Proceedings of the ACM CHI 1994, pp. 358-364.

Buxton, "A Three-State Model of Graphical Input", In D., Diaper (Eds), Human-Computer Interaction—INTERACT '90., Amsterdam: Elsevier Science Publishers B.V. (North-Holland), pp. 449-456.

Buxton, et al., "From Traditional to Electronic Large Displays in Automotive Design", IEEE Computer Graphics and Applications, 20(4), pp. 68-75.

Callahan, et al., "An Empirical Comparison of Pie vs. Linear Menus", Proceedings of CHI '88, pp. 95-100.

Elrod, et al., "Liveboard: A Large Interactive Display Supporting Group Meetings, Presentations, and Remote Collaboration", Proceedings of ACH CHI 1992, pp. 599-607.

Fitzmaurice et al., "Tracking Menus", Proceedings from ACM CHI 2003, vol. 5, Issue 2, pp. 71-80.

Guimbretiere, et al., "FlowMenu: Combining Command, Text, and Data Entry", Proceedings of ACM UIST 2000, pp. 213-216.

Guimbretiere, et al., "Fluid Interaction with High-Resolution Wall-size Displays", Proceedings of ACM UIST 2001, pp. 21, 30.

Harrison, et al., "An Experimental Evaluation of Transparent User Interface Tools and Information Content", Proceedings of ACM U IST, 1995, pp. 81-90.

Harrision, et al., "Squeeze Me, Hold Me, Tilt Me! An Exploration of Manipulative User Interfaces", Proceedings of ACM CHI 1998, pp. 17-24.

Hopkins, "The Design and Implementation of Pie Menus", Dr. Dobbs Journal, 16(12), pp. 16-26.

Kurtenbach, et al., "The limits of expert performance using hierarchical marking menus", Proceedings of the ACM CHI, 1993, pp. 482-487.

Kurtenbach, et al., "The Design of a GUI Paradigm based on Tablets, Two-Hands, and Transparency", Proceedings of ACH CHI 1997, pp. 35-42.

Kurtenbach, "The Design and Evaluation of Marking Menus", Ph.D., thesis, University of Toronto, Dept. of Computer Science.

MacKenzie, et al., "Prediction of Pointing and Dragging Times in Graphical User Interfaces Interacting With Computer", 1994, 6(4), pp. 213-227.

Myers, et al., "Creating Highly-Interactive and Graphical User Interfaces by Demonstration", Computer Graphics 20(3), Proceedings of SIGGRAPH '18, 1986, pp. 249-258.

Perlin, et al., "Pad: An Alternative Approach to the Computer Interface", Proceedings of ACM SIGGRAPH 1993, pp. 57-64.

"Point-N-Click virtual mouse", Polital Enterprises, pp. 1-9, Dec. 1, 2001.

Pook, et al., "Control Menus: Execution and Control in a Single Interactor", Proceedings of ACH CHI 2000 Extended Abstracts, pp. 263-264.

Rubio, et al., "Floating Pie Menus: Enhancing the functionality of Contextual Tools", Proceedings of ACM UIST 2002 Conference Companion, pp. 39-40.

Non-Final Office Action dated Apr. 18, 2006 in U.S. Appl. No. 10/684,581.

Final Office Action dated Apr. 19, 2007 in U.S. Appl. No. 10/684,580.

(56) References Cited

OTHER PUBLICATIONS

Final Office Action dated Dec. 11, 2008 in U.S. Appl. No. 10/684,579.
Final Office Action dated Dec. 11, 2008 in U.S. Appl. No. 10/684,580.
Non-Final Office Action dated Jan. 20, 2010 in U.S. Appl. No. 10/684,579.
Non-Final Office Action dated Jun. 2, 2008 in U.S. Appl. No. 10/684,579.
Final Office Action dated Jun. 26, 2007 in U.S. Appl. No. 10/684,579.
Non-Final Office Action dated May 14, 2008 in U.S. Appl. No. 10/684,580.
Non-Final Office Action dated Nov. 13, 2009 in U.S. Appl. No. 10/684,580.
Non-Final Office Action dated Oct. 13, 2006 in U.S. Appl. No. 10/684,579.
Final Office Action dated Sep. 26, 2006 in U.S. Appl. No. 10/684,581.

* cited by examiner

PEN-MOUSE SYSTEM

CROSS-REFERENCE TO RELATED APPLICATION(S)

This application is a continuation of U.S. patent application Ser. No. 11/754,019, filed May 25, 2007, issued as U.S. Pat. No. 8,904,310, which is a continuation of U.S. patent application Ser. No. 10/684,581, filed Oct. 15, 2003, U.S. Pat. No. 7,242,387, which is related to and claims priority to U.S. provisional application entitled Tracking Menu System having Ser. No. 60/419,144, by Fitzmaurice et al, filed Oct. 18, 2002. This application is also related to U.S. application entitled Tracking Menu, System and Method having Ser. No. 10/684,580, by Fitzmaurice et al, filed Oct. 15, 2003 and to U.S. application entitled Pan-Zoom Tool having Ser. No. 10/684,579, by Fitzmaurice et al, filed Oct. 15, 2003. The subject matter of these related applications is hereby incorporated herein by reference.

BACKGROUND OF THE INVENTION

1. Field of the Invention

The present invention is directed to a tracking menu that can be used with a pen based computer and that provides a pen user the functionality of a mouse and, more particularly, to a pen-mouse that tracks a position of a pen or stylus, allows pointing like a mouse and emulates the functionality of mouse buttons and other mouse inputs, such as a finger rollable wheel.

2. Description of the Related Art

Stylus or pen-based computers, such as tablet (personal computers) PCs and personal digital assistants (PDAs) are becoming a popular type of computing device. These devices operate somewhat differently than the typical mouse-based computer systems. In the pen-based devices the user uses a stylus or pen to select and activate items, such as menu controls/buttons, as well as to perform graphic functions, such as drawing. In performing these different operations it is often the case that the user must move the pen to a menu to select a function and then return to the display area to perform the function. Because these pen-based operations are somewhat different from traditional mouse based operations, it can be helpful to a new user to have a familiar paradigm, such as a mouse, that can be used in pen-based computers to perform mouse type operations.

What is needed is an interface that provides a user with the look and "feel" of operation of a mouse and avoids the need to move to a menu to select mouse functions, such as left button, right button, scroll, etc.

SUMMARY OF THE INVENTION

It is an aspect of the present invention to provide a graphical user interface that emulates a mouse input device and is controlled by a pen of a pen based computer.

It is another aspect of the present invention to provide a mouse emulation that functions as a tracking menu.

It is also an aspect of the present invention is to provide mouse emulation that does not use keyboard events/signals but does emulate some keyboard keys (e.g., shift/alt)

The above aspects can be attained by a system that provides a pen based computer user with a tool, a pen-mouse, that functions like a mouse but that is controlled by a limited input device, such as a pen or stylus. The pen-mouse is a tracking menu that tracks the position of the pen. A pen-cursor that corresponds to the pen is allowed to move about within a pen-mouse graphic. The pen-mouse is moved when the location of the pen, pen cursor or pen transducer sensed position encounters a tracking boundary of the pen-mouse. While moving within the pen-mouse the pen can select objects within the pen-mouse such as buttons, wheels, etc. The selection of a button or other virtual control causes a corresponding mouse button function to be executed. The execution focus is directed at any object designated by a tracking symbol, such as an arrow, that is part of the pen-mouse graphic.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
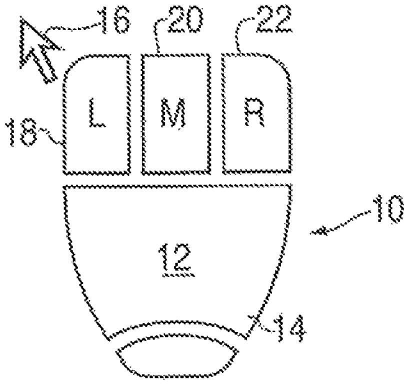
FIG. 1 illustrates a pen-mouse tracking menu according to the present invention.

The present invention is directed to a user interface, particularly, a graphical user interface (GUI) that has the appearance of a mouse 10 as depicted in FIG. 1. This interface 10, which for convenience will be called a pen-mouse, is a tracking menu where the pen-mouse 10 tracks the position of a stylus or pen being used with a pen-based computer. A tracking menu is a graphical user interface widget that is controlled by either a pen or mouse having an associated pen or mouse cursor where the cursors can be invisible. A tracking menu is invoked and dismissed in the same manner as a traditional modal tool by clicking on a tool palette or menu item. Like traditional menus, a tracking menu includes a cluster of graphical buttons or controls. The pen cursor can be moved within the menu to select and interact with items, such as the buttons. However, unlike traditional menus, when the pen cursor crosses the exterior edge or tracking boundary of the menu, the menu is moved to keep it under the cursor. The pen-mouse tracking menu, of the present invention, can track other types of input devices, such as a finger in a touch based menu, a traditional mouse and 3D input devices such as gloves. Additional details with respect to tracking menus can be found in the related application noted above.

The pen-mouse 10 preferably includes a mouse graphic 12 that includes a visible border or edge 14 and a traditional arrow cursor or tracking symbol 16. This pen-mouse tracking menu 10 tracks the position of the pen of the pen based computer system as will be discussed later in more detail. By moving the pen, the cursor 16 can be positioned to point at an object in the same way that a cursor for a mouse is positioned to point at an object. The mouse graphic 12 depicts three buttons 18 (left—L), 20 (middle—M) and 22 (right—R) that are conventional type virtual controls specifically for initiating mouse button down events when activated by a pen down event with the pen tip positioned over one of the buttons 18-22. The tracking symbol or cursor 16 behaves like a traditional tracking symbol used with a mouse where the tracking symbol can point at (be positioned over) an object, such as a menu, and activate the object when a mouse down event occurs. That is, conventional input mapping based on location of an input sensor or cursor are performed. As a result, when the cursor 16 is positioned over an activatable object and a pen down event occurs with the pen located over one of the buttons 18-22, a mouse down event for the corresponding mouse button occurs for the object at which the cursor points. In this way, the pen of the pen-based computer system can be used to perform the same functions as a mouse in a mouse based computer system.

Figure 2:
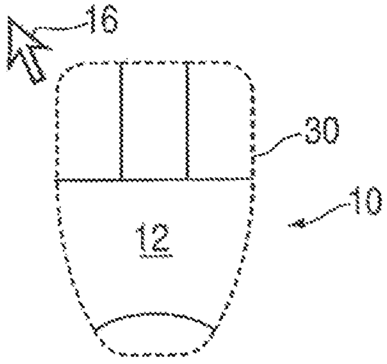
FIG. 2 depicts a tracking border of the pen-mouse.

The pen-mouse tracking menu 10, as depicted in FIG. 2, includes a tracking menu tracking boundary 30 that allows the pen cursor 16 to move within the tracking menu 10 without causing the menu to pen-mouse 10 to move with the movement of the pen. The boundary 30 is shown as coinciding with the visible edge of the graphic 12 but need not be so coincident (see FIG. 27).

Figure 3:
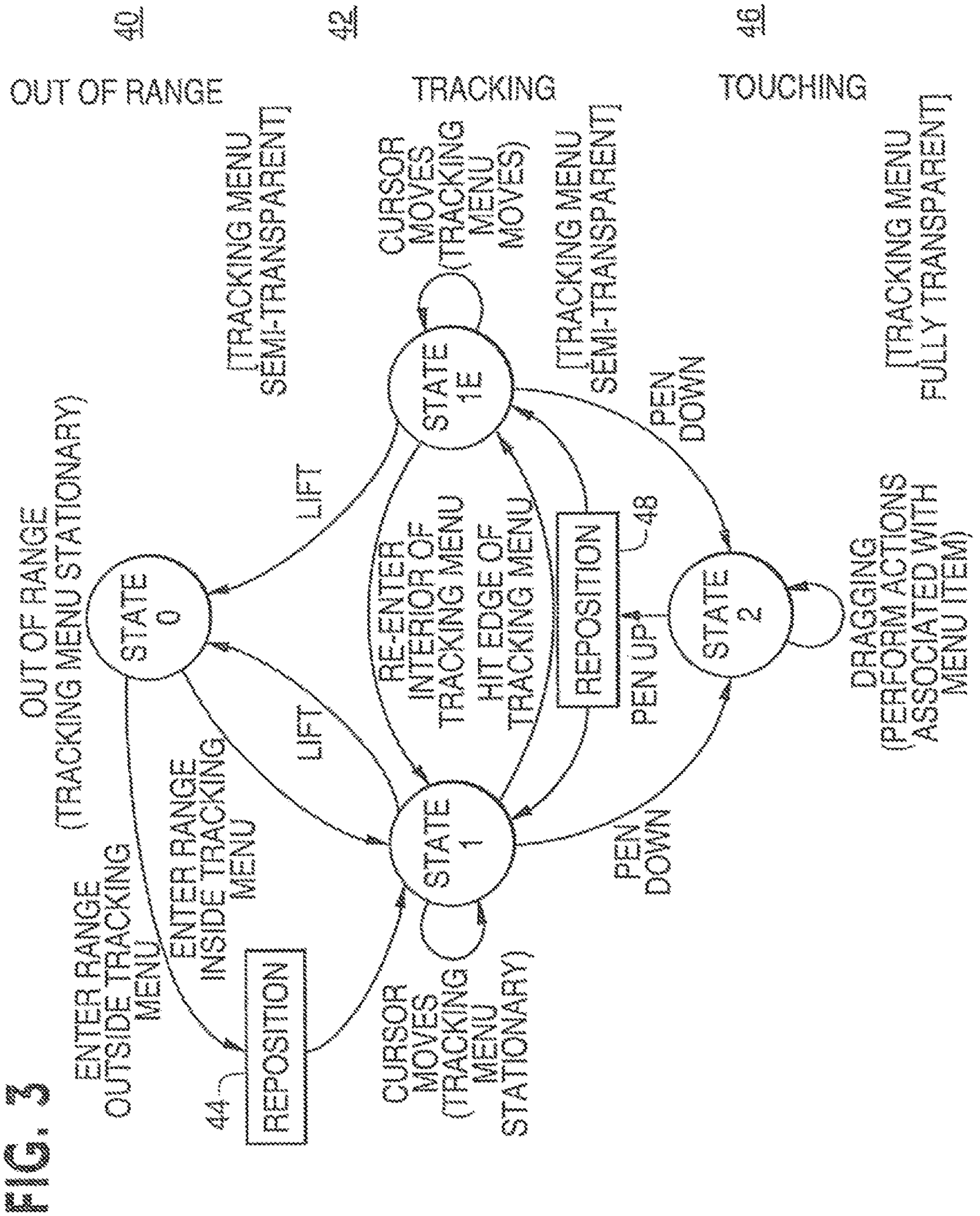
FIG. 3 illustrates tracking states.

The operation of the pen-mouse tracking menu 10 of the present invention can be understood using a state diagram as depicted in FIG. 3. In state 0 the pen is out-of-range 40 of the tracking system of the pen based computer, such as a tablet PC, and the tracking menu 10 is visible (preferably semi-transparent) and is positioned in the last place it resided before the pen moved out-of-range or in an initial position if the tracking menu has just been involved. The state 0 is entered from states 1 and 1 E when the pen is lifted from the tablet and moved out-of-range. The menu 10 resides in this last position until the pen is brought back into range and the tablet PC begins tracking the pen.

The pen can move into tracking range 42 and enter state 1 in two different ways. In the first into-range transition, the pen comes down at a position where the Up of the pen is outside of the tracking menu edge or tracking boundary 30. When tracking starts in this condition, the menu 10 is moved or repositioned 44 so that the cursor is inside the menu edge. This involves conventionally redrawing the semi-transparent menu 10 at a position corresponding to the pen tip, cursor or sensed pen transducer position. This repositioning or redrawing can place the menu 10 such that the menu 10 is moved the minimum distance to place the pen cursor just within the edge of the menu 10. Or the repositioning can place the menu at an arbitrary position under the cursor, such as positioning the menu with the pen tip in the center of the menu. The second into-range transition occurs when the pen tip comes into range when it is within the boundary 30 of the tracking menu 10.

In state 1 the pen cursor moves freely about within the menu 10 and the menu 10 stays stationary. During this movement of the pen cursor within the menu 10, the system performs conventional operations, such as highlighting buttons or controls over which the cursor passes by comparing the position of the cursor to positions of the buttons. However, if the pen is lifted out-of-range the state moves to state 0 (the pen tracking becomes inactive), if the pen encounters an edge as it moves, state 1 E is entered and if the pen touches the tablet surface state 2 is entered.

To enter state 1 E the position of the pen cursor (or pen tip transducer position) is conventionally compared to the position of the edges or boundary 30 of the tracking menu 10. When a match occurs, the cursor has hit the edge and the state 1 E is entered. In state 1 E, as long as the cursor is at or in contact with an edge as the cursor moves, the tracking menu (semi-transparent) is moved along with the cursor. That is, as the cursor is moved, the menu 10 is conventionally redrawn with the cursor at the edge of the tracking menu. In state 1 E, if the pen is lifted out-of-range the state moves to state 0, if the pen moves away from an edge to reenter the interior of the menu the state moves to state 1 and if the pen touches the tablet, state 2 is entered.

As discussed above, state 2 is entered when the pen touches 46 the tablet surface while in state 1 or state 1 E. In this state the pen is active or activated such that it will cause some function to be performed. In state 2 the active pen can be selecting a button, in which case the function of the button is performed, such as selection of a new. The tracking menu does not have to become transparent while in state 2. The controls or buttons of the present invention can be designed to work such that when you press on them, they show some highlighting and the assigned function is executed only on pen-up. This allows the user to cancel their action by moving off of the button while in the pressed state and thus preventing the triggering of the function. Or the active pen can be moving while under the control of a previously selected function, such as painting with a previously selected paintbrush or zooming based on a previous selection of a zoom tool/function. In state 2, the tracking menu 10 is made fully transparent. In this state, the system can continue to reposition the fully transparent menu under the cursor or preferably the menu can be allowed to remain in it's last position as in state 0 (note the user would not perceive a difference between these two alternatives). When the pen is lifted from the tablet surface and contact with the tablet ends, the tracking mode 42 is again entered and the menu 10 is repositioned 48 depending on the as state. If the pen is lifted when the prior state is state 1 E, the pen is repositioned 48 at the last edge point of state 1 E. If the pen is lifted when the prior state is state 1, the pen is repositioned 48 at the last interior point of state 1.

Additional details concerning tracking operations can be found in the related application previously noted.

Figure 4:
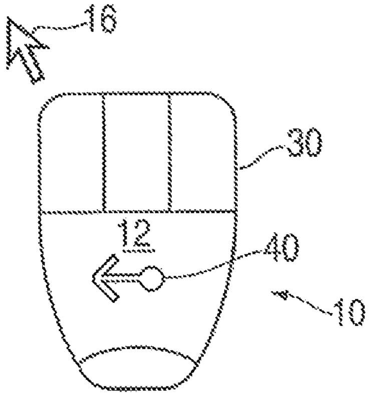
FIG. 4 shows a pen cursor moving within the pen-mouse.
Figure 5:
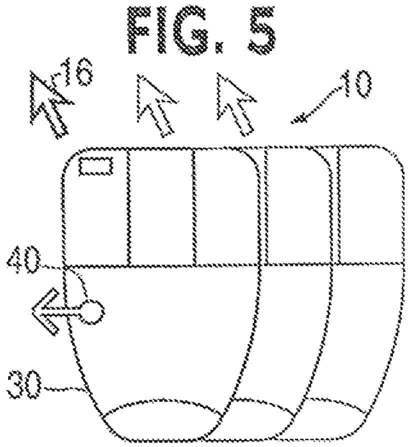
FIG. 5 shows the pen cursor moving the pen-mouse.

FIG. 4 illustrates a pen cursor or pen transducer location symbol 40 moving to the left within the tracking boundary 30 of the pen-mouse 10 and the pen-mouse 10 remaining stationary. That is, within the body of the virtual mouse 10, movement of the sensed position 40 of the input transducer does not cause the tracking menu 10 to move. In FIG. 5 the moving cursor 40 has encountered or hit the boundary 30 when moving to the left and the encounter with the boundary causes the pen-mouse 10 to move to the left. That is, movement of the tracking menu 10 occurs when the sensed position of input transducer 40 hits the tracking menu border 30 while the input transducer is in a "tracking state" (i.e., not during a mouse down state).

Figure 6:
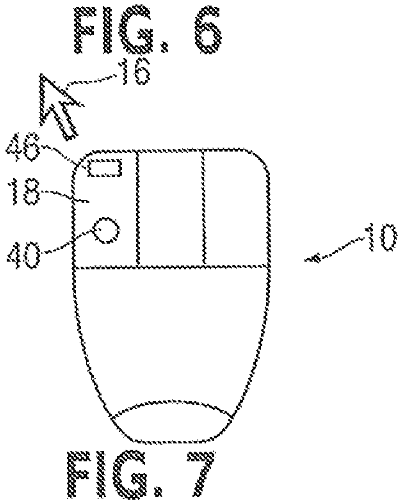
FIGS. 6 and 7 show a button being highlighted and selected.
Figure 7:
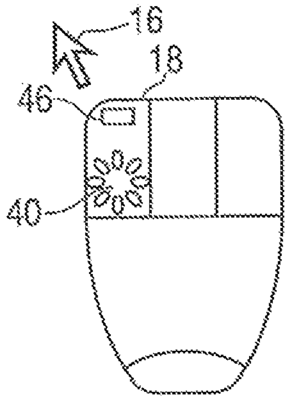

As depicted in FIG. 6, moving the input transducer 40 over the left mouse button graphic 18 causes this sub-component to "highlight" (the faint bar 46 at the top of the left mouse button 18). Note that the input transducer 40 is still in the "tracking" state not a "mouse button down" state. A mouse down event (pen down over a mouse button) is depicted in FIG. 7. When a "mouse button down" state occurs with the input transducer (e.g., with a pen, the pen tip is engaged by a tapping down of the pen onto the digitizer or tablet surface), the action of the tracking menu sub-component is executed. Tapping typically implies both the pressing down and lifting up of a pen on a surface. Here, by mouse button down when a stylus is involved is meant that the pen tip comes in contact with the surface. In this case, an event for the left mouse button 18 is generated, the bar 46 can be strongly highlighted, the pen down cursor position 40 can highlighted by a visible state change, such as the hot spot star shown in FIG. 7, to indicate that a hotspot action is occurring at the tip of the arrow cursor 16. That is, any object, such as a menu item, at the tip of the arrow cursor or tracking symbol 16 is activated.

The pen-mouse 10 of the present invention can not only provide the traditional simple mouse tracking symbol and single mouse button functions discussed above but can also provide more complicated functions as discussed below.

Figure 8:
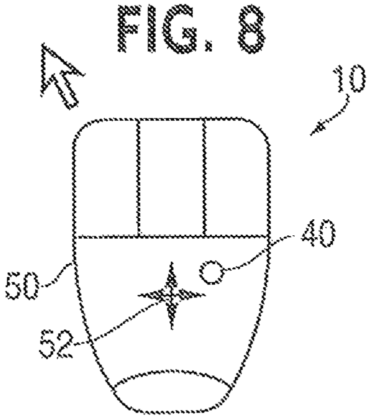
FIGS. 8-10 depict the pen-mouse during pan tracking.
Figure 9:
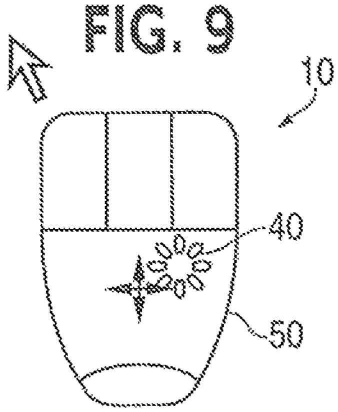
Figure 10:
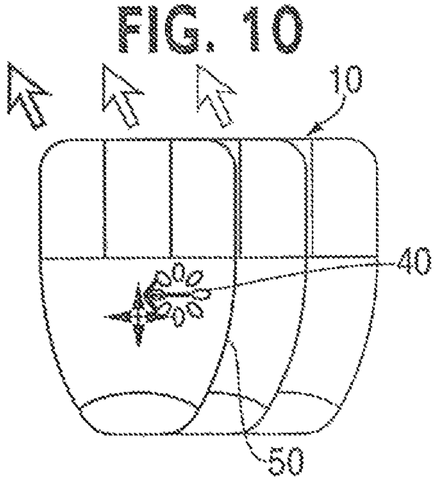

Positioning the input transducer 40 over the body 50 of the mouse 10 can cause a pan tracking symbol 52 to appear as depicted in FIG. 8. A pen down event within the mouse body subcomponent 50 of the tracking menu 10 can cause the tracking symbol 40 to change to a more bold visual state as shown in FIG. 9. In this condition with the pan function activated, a mouse drag event (dragging the pen tip over the surface of the tablet PC or digitizer while the pen tip is touching the surface) within the mouse body 50 causes the tracking menu 10 to be dragged a distance and direction corresponding to the transducer 40 motion as illustrated in FIG. 10.

Figure 11:
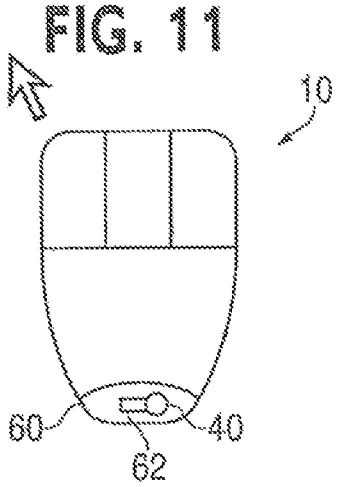
FIGS. 11 and 12 show the pen-mouse bar function highlighted and activated.
Figure 12:
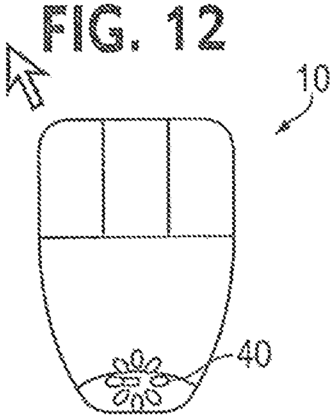
Figure 13:
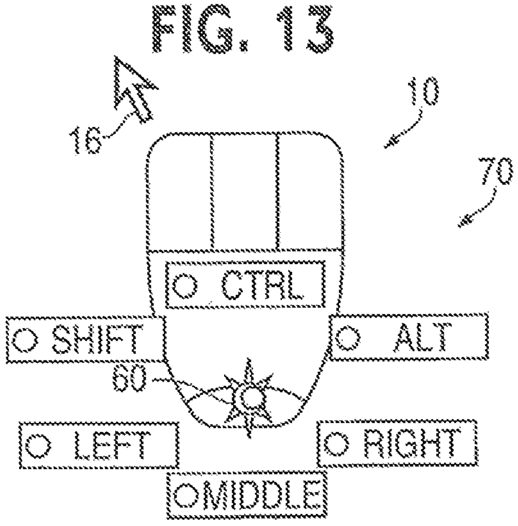
FIGS. 13-23 show marking menu activation and double button function activation
Figure 14:
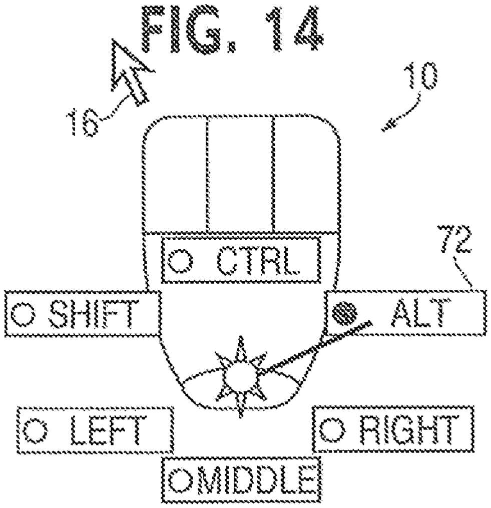
Figure 15:
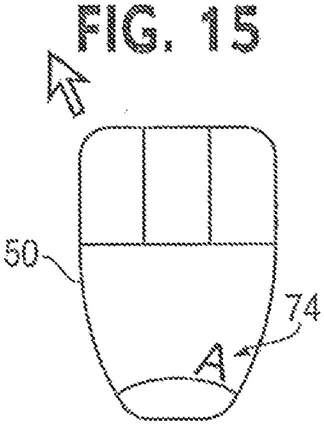
Figure 16:
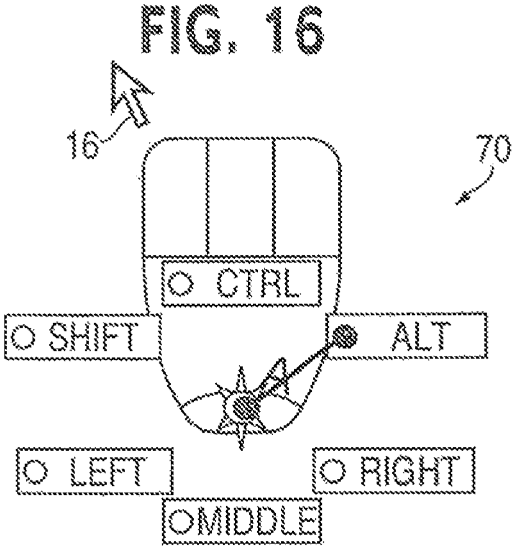
Figure 17:
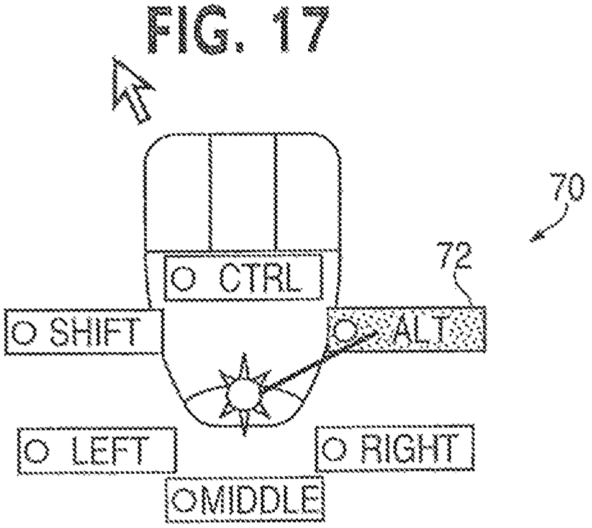
Figure 18:
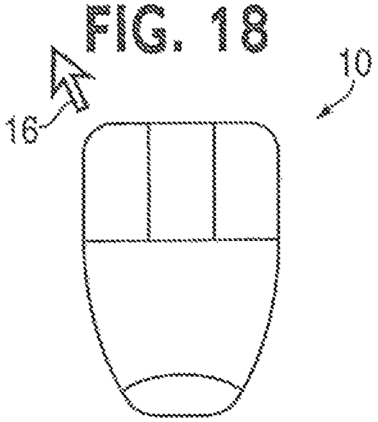
Figure 19:
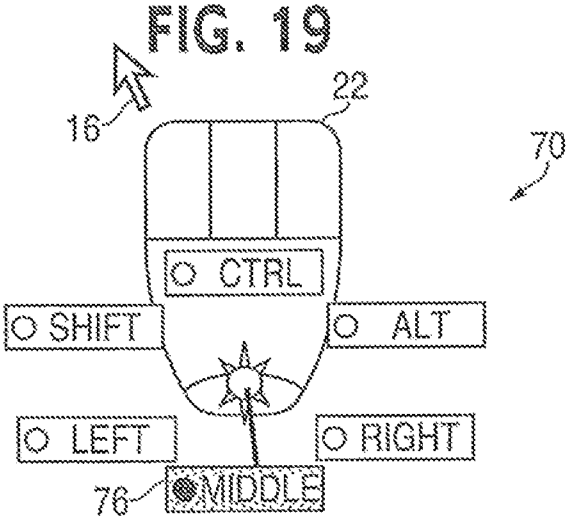
Figure 20:
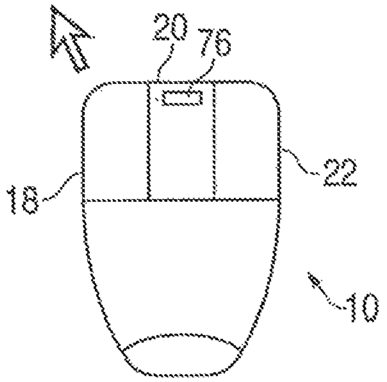
Figure 21:
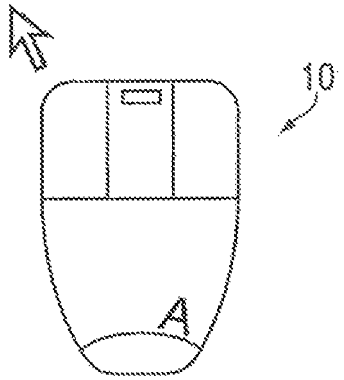
Figure 22:
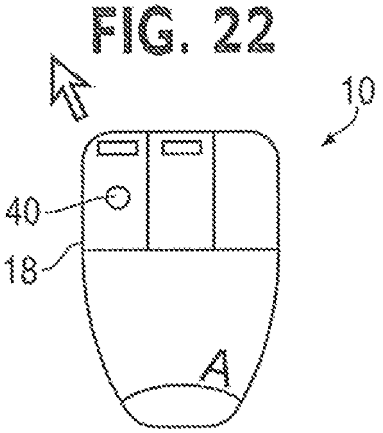
Figure 23:
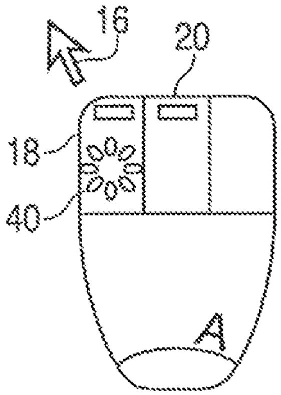

Positioning the input transducer 40 over a bottom tab 60 of the pen-mouse 10 can causes a bar tracking symbol 62 to appear (see FIG. 11) indicating the user is over this sub-component. Once again, a mouse down event within the mouse bottom tab subcomponent 60 of the tracking menu 10 causes the pen tracking symbol 40 to change to a more bold visual state (see FIG. 12) and invokes the subcomponent action. In this case, the subcomponent action, as illustrated in FIG. 13 is to invoke a set of marking menus 70. The behavior of the menus 70 matches that of the traditional marking menus. In FIG. 14, we see the user selecting "Alt" 72 which is a "check-box" item (i.e., remains enabled until the "Alt" item is explicitly selected again to toggle the state off). A pen-up event over the "Alt" menu item turns "Alt-lock" on and feedback is provided on the body of the mouse (the "A" character 74 of FIG. 15). A pen-down on the bottom tab again brings up the marking menu 70 (see FIG. 16). Selecting Alt 72 again (see FIG. 17) turns off "Alt-lock" (see FIG. 18). Selecting "Middle" 76 from the marking menu 70 (see FIG. 19) can turn on a "Middle-lock" (see the bar 76 of FIG. 20 indicating this state) that results in always generating a corresponding middle button mouse down/up event when any of the virtual pen-mouse buttons are engaged for a down/up action (see FIG. 19). FIG. 20 shows both "Middle-lock" and "Alt-lock" turned on. Hovering the pen 40 over the left button 18 in this mode (as depicted in FIG. 22) followed by a pen-down on the pen-mouse 10 left mouse button 18 in this mode can cause left mouse button 18 and middle mouse button events to be generated as depicted by the highlighted pen cursor symbol 40 of FIG. 23. This pair of events is focused on any object at which the arrow cursor 16 is pointing. That is, initiating an event that requires a two button "click" on a mouse can be accomplished using the pen-mouse 10 of the present invention.

Figure 24:
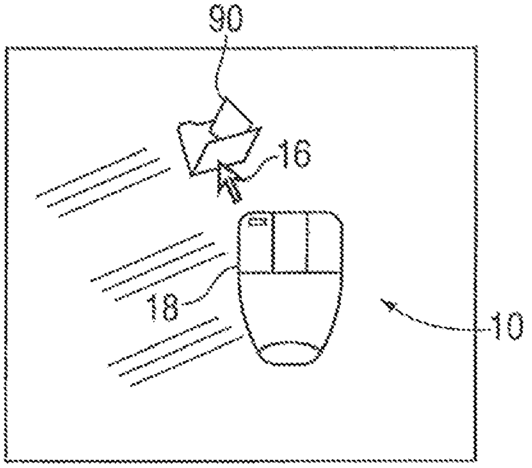
FIG. 24 shows object dragging with the pen-mouse.

FIG. 24 depicts a left mouse button drag event in progress. In this operation, the user has positioned the arrow cursor 16 on top of the "Folder" icon 90 and has engaged the left mouse button 18 of the pen-mouse 10 and begun dragging the pen 40 across the tablet while the tip is touching, thereby dragging the pen-mouse that drags the folder 90.

Figure 25:
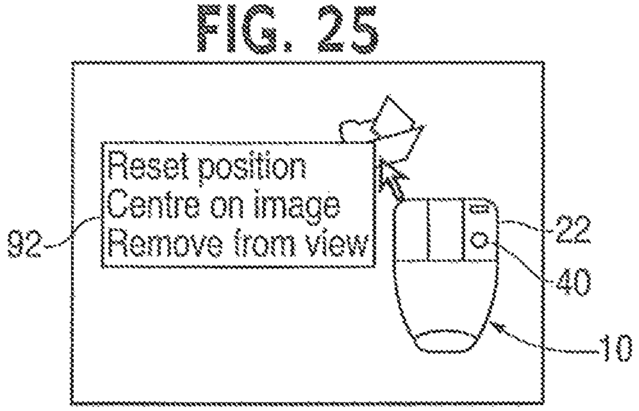
FIGS. 25 and 26 depict linear menu activation and selection.
Figure 26:
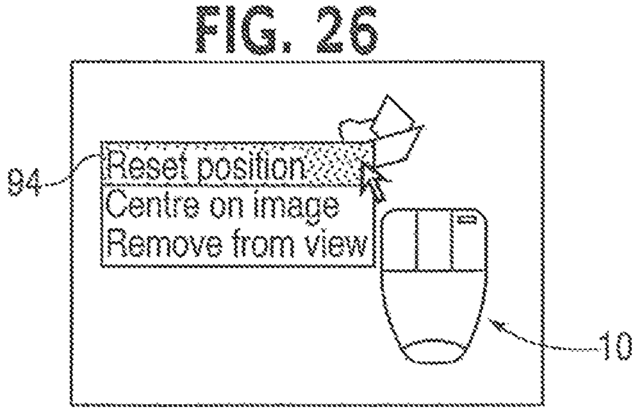

In FIG. 25 the user has engaged the right mouse button by placing the tracker symbol 40 over the right mouse button component 22 of the pen-mouse 10 and performing a down event with the input transducer. This results in a pop-up menu 92 appearing, in this case to the left of the arrow cursor. FIG. 26 shows dragging the pen downward (see the moved position of the highlighted pen tracking symbol as compared to FIG. 25) and this causes various menu items to highlight (in this case the "Reset Position" item 94) as one would expect. That is, the menu 10 can behave like a standard pop-up menu.

Figure 27:
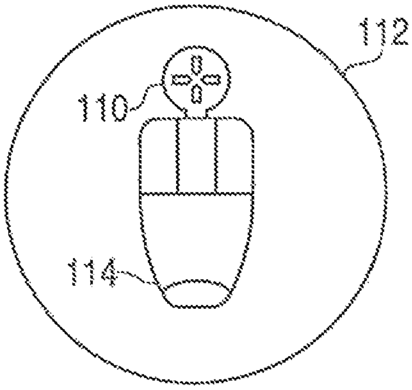
FIG. 27 illustrates a tracking boundary not coinciding with the body graphic.

The pen-mouse of the present invention need not use the arrow as the tracking symbol and can have a tracking menu boundary or edge that does not coincide with the visible edge of the mouse graphic. These alternatives are depicted in FIG. 27 where the pen-mouse tracking symbol 110 is a "hotspot" type symbol and the tracking menu border 112 is a circle much larger that the graphic 114.

The tracking symbol used with the pen-mouse, such as the arrow, can be positioned or oriented anywhere around the mouse graphic body. This choice in positioning can be designated by the user or managed by the system. For example, the system can move the arrow toward a display edge to allow easier selection of edge items. Examples of different positions for the symbol 120 are shown in FIGS. **28*a*-28*g* and the utility or usefulness of each position includes: 28*a*—screen top edge objects, 28*b*—left handed users and top right screenedge objects, 28*c*—right edge objects, 28*d*—tom right edge objects, 28*e*—bottom screen edge objects, 28*f*—bottom left edge objects, and 28*g***—left edge objects.

Figure 29:
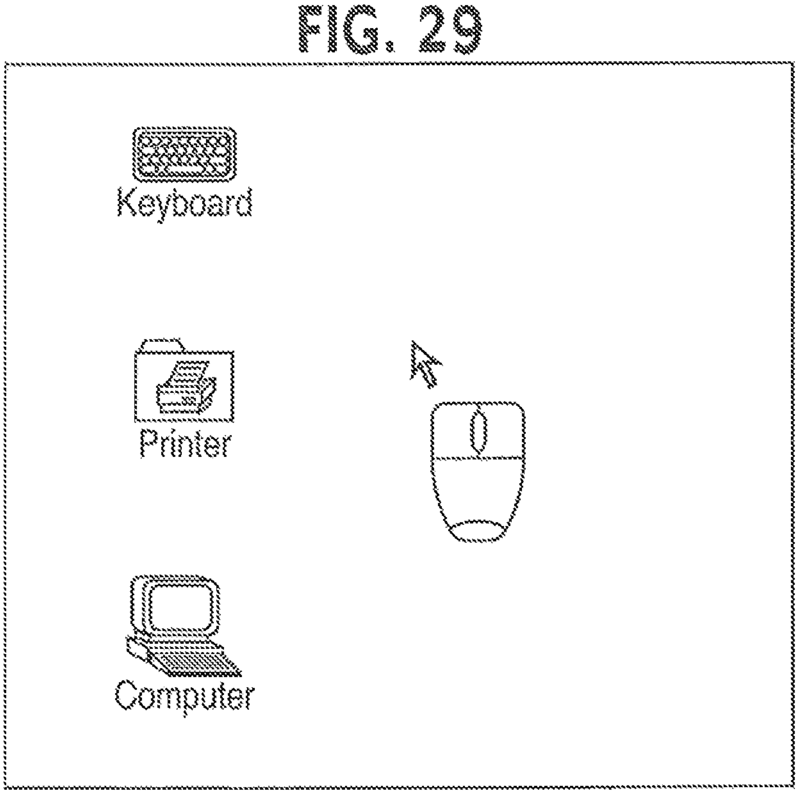
FIG. 29 depicts a different pen-mouse graphic with a wheel function.
Figure 28A:
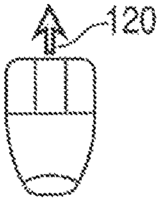
FIGS. 28*a*-28*g* illustrate different positions for the pen-mouse tracking symbol.
Figure 28B:
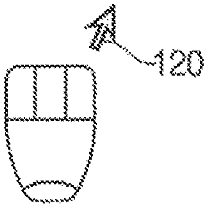
Figure 28C:
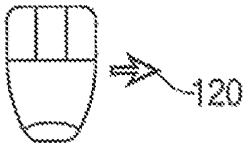
Figure 28D:
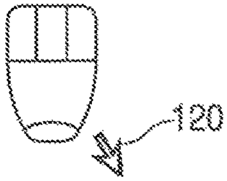
Figure 28E:
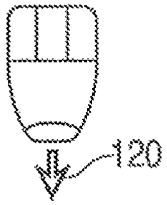
Figure 28F:
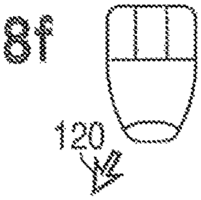
Figure 28G:
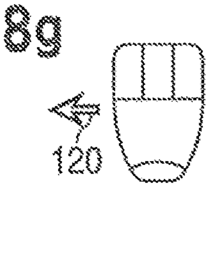
Figure 30:
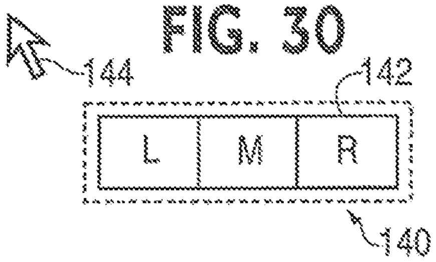
FIG. 30 shows a limited function and a limited graphic pen-mouse.
Figure 31:
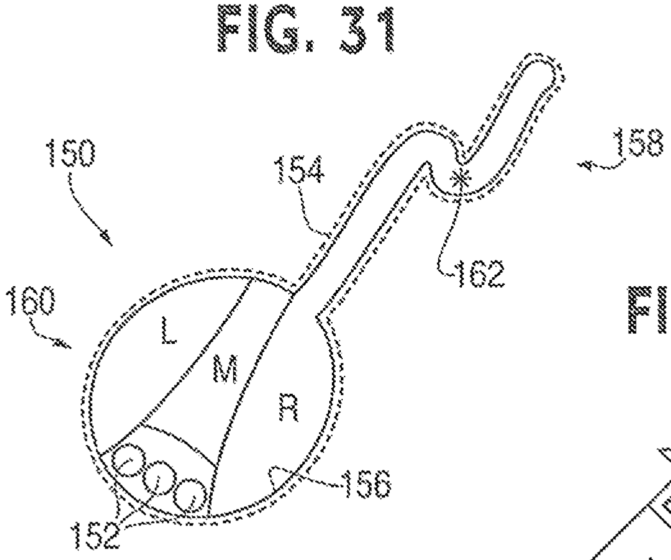
FIG. 31 shows a pen-mouse with activation safety features.
Figure 32:
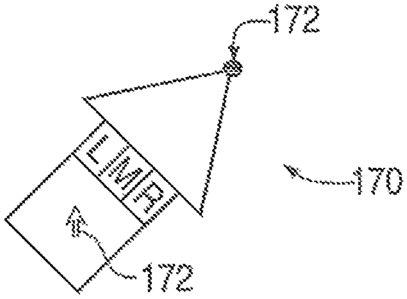
FIG. 32 shows an arrow shaped pen-mouse.

The pen-mouse can have a number of different appearances, shapes or body/graphic designs. FIG. 29 illustrates a pen-mouse 130 with a different shape and different functions including a wheel where the virtual wheel can be dragged up/down and the same actions as would occur when rotating a wheel are performed. FIG. 30 depicts a pen-mouse 140 where only the buttons 142 are shown, where the tracking symbol 144 is a predetermined distance from the buttons 142 and the tracking border or boundary 146 has additional space on the right. FIG. 31 illustrates a pen-mouse 150 with traditional L, M, R buttons and modifier keys. The tracking boundary 154 is depicted by a dashed line and coincides with the mouse graphic 156. This pen-mouse 150 includes a neck 158 attached to a base function region 60. The neck prevents the pen tracking symbol 162, a hot spot in this case, from accidentally triggering the functions of the base region 160. FIG. 32 shows a pen-mouse 170 shaped like an arrow or a dragable cursor with LMR buttons and an action hot spot at the tip 172 of the arrow. The pen tracking symbol 172 is shown in the body.

Figure 33:
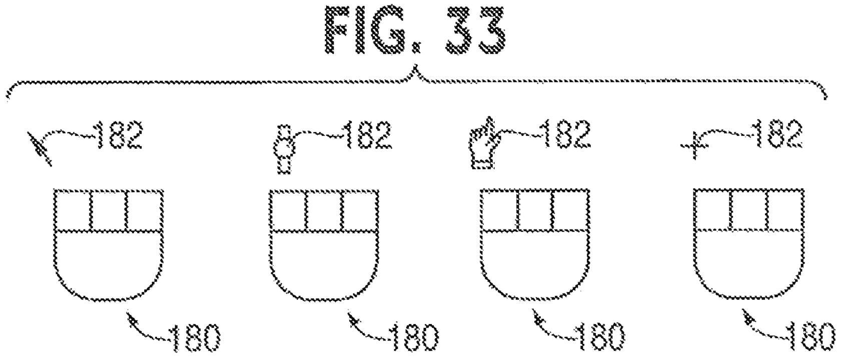
FIG. 33 shows pen-mouse tracking symbols changing according to system state.

FIG. 33 shows a pen-mouse 180 in which traditional changeable cursor states are shown. The tracking or action symbol 182 may also change as a function of the system state. The tracking symbol may also not change and rather only the system cursor changes which is attached to the tracking menu mouse body.

Figure 34:
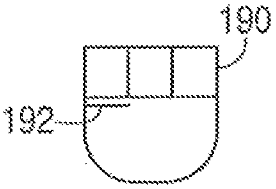
FIG. 34 shows an interior tracking wall.
Figure 35:
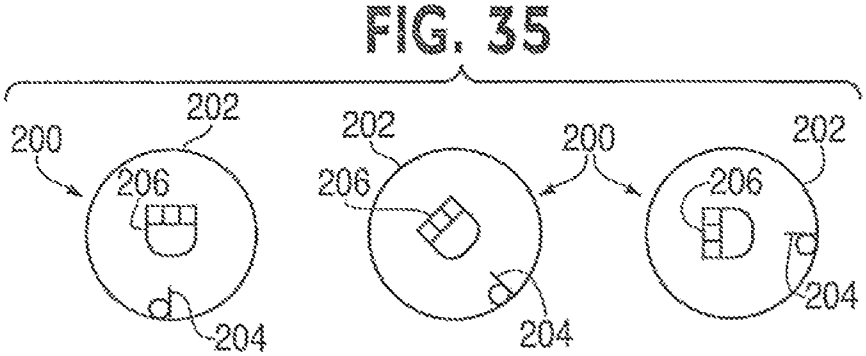
FIG. 35 shows a wall being used to provide track ball functionality.

FIG. 34 depicts a pen-mouse 190 that includes an interior tracking wall 192 jutting from the tracking boundary that coincides with of the pen-mouse graphic. When the pen tracking cursor encounters this wall 192 the pen-mouse is moved similarly to the cursor encountering the exterior tracking boundary. FIG. 35 illustrates a pen mouse 200 with a tracking boundary 202 having tracking wall 204 extending into the interior and that rotates the mouse graphic 206 when the pen cursor 208 encounters the wall 204. This allows the pen-mouse 200 to function like a virtual track ball.

Figure 36:
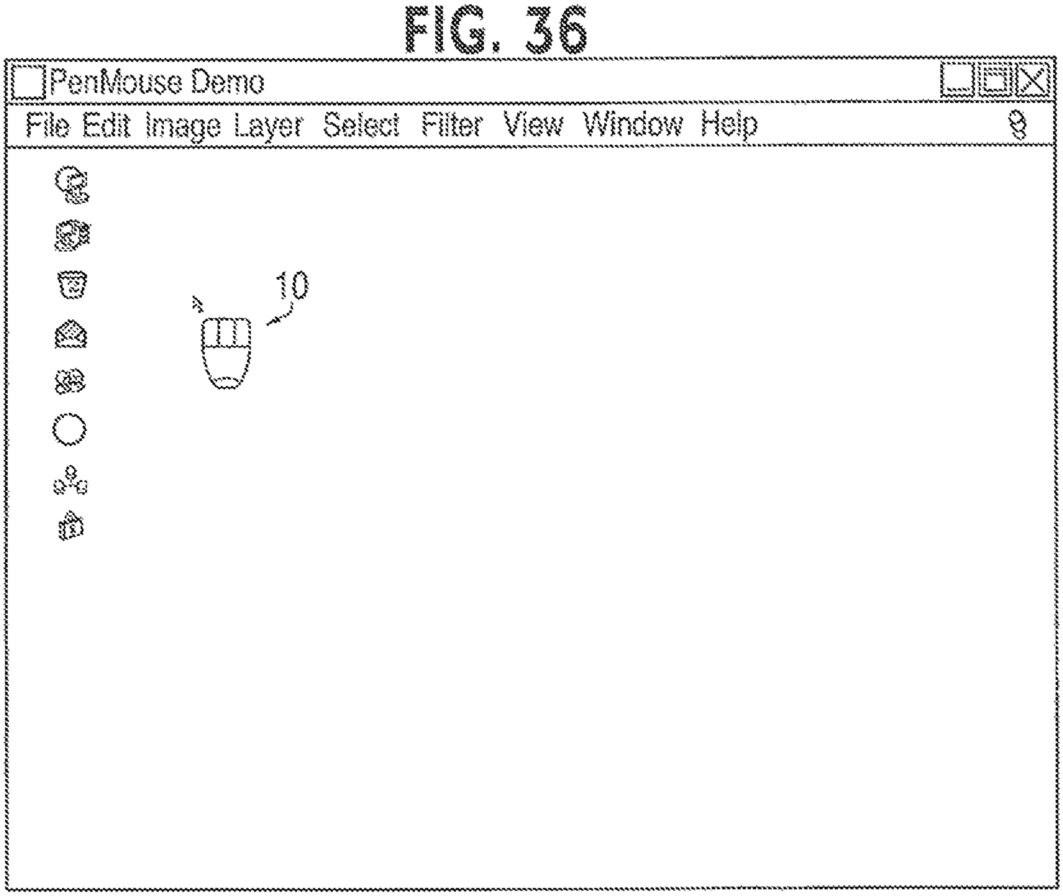
FIG. 36 shows pen-mouse relative size.

When the pen-mouse 10 of the present invention is displayed on a typical pen based computer display, the pen-mouse 10 is preferably displayed at a size similar to other tools of computer display as shown in FIG. 36. When the pen-mouse 10 is moved about on the display is preferably maintained on top of all objects in the display including menus and other persistent objects.

Figure 37:
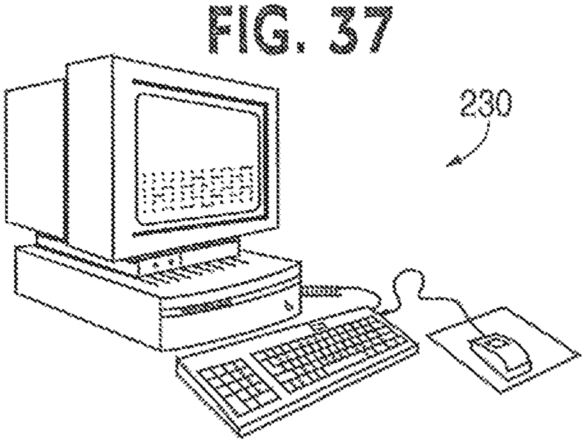
FIG. 37 shows a desktop PC as hardware of the present invention.
Figure 38:
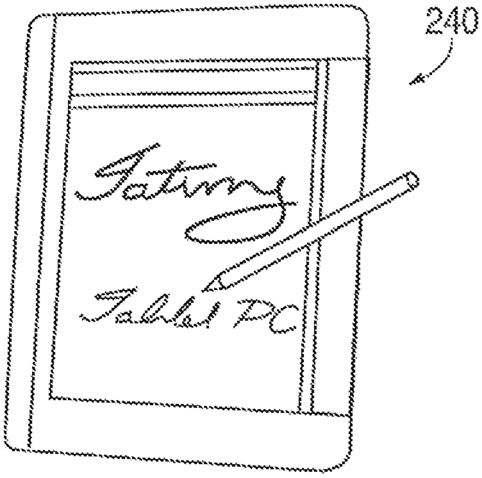
FIG. 38 depicts a tablet PC as hardware of the present invention.
Figure 39:
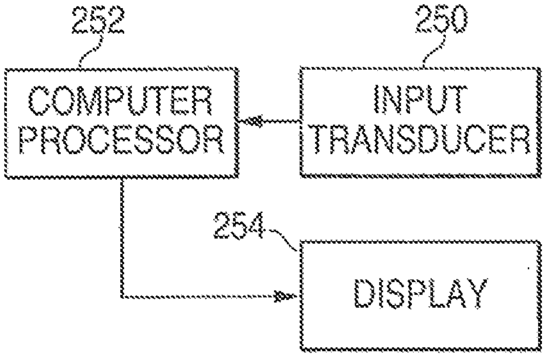
FIG. 39 shows components of the hardware of the present invention.

The hardware of the pen-mouse tracking menu system can be within a desktop PC 230 (see FIG. 37) or within a handheld device, such as a tablet PC 240 (see FIG. 38) or a PDA, and includes an input transducer 250 the position of which is tracked by a computer 252 that processes the transducer positions and creates the tracking menu display that is presented on a display 254 as shown in FIG. 39.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The present invention has been described with respect to using a tablet type personal computer. The present invention is also suitable for other types of systems including large display formats (front and rear projection) both horizontal and vertical large displays, such as electronic whiteboards. Other input devices than a pen can also be used. For example, an audience could be viewing a large display presentation and if a user wants to manipulate the display from theft seat, they could use a laser pointer type device. Here the pen tip down event would be generated by a dwell event or a secondary button on the laser pointer. The present invention has also been described with respect to a single input device being used with the system. The invention is also operable with two or more PenMice active at the same time, driven by two or more input devices. This allows two handed interaction techniques or collaborative multi-user applications.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

We claim:

1. A computing device, comprising:
a display; and
a processor configured according to a set of instructions to generate a graphical user interface to be displayed on the display, the graphical user interface including:
a mouse graphic having the appearance of a computer mouse;
at least one button control positioned within the graphic, wherein, when a pen type input device contacts the display directly above the at least one button control, the pen type input device enters into an active state, and regardless of whether the pen type input device remains in contact with the display, a function assigned to the at least one button control immediately triggers;
a tracking symbol graphic associated with the mouse graphic and indicating event focus; and
a tracking menu boundary providing tracking menu control of the interface for a pen type input device, wherein the mouse graphic is moved when a cursor associated with the pen type input device encounters the tracking menu boundary.

2. The computing device of claim 1, wherein the tracking boundary coincides with an edge of the mouse graphic.

3. The computing device of claim 1, wherein the tracking boundary comprises a safety neck.

4. The computing device of claim 1, wherein the tracking menu control is activated by a pen input event.

5. The computing device of claim 1, wherein three button controls are provided and multiple button events can be emulated.

6. The computing device of claim 1, wherein the interface is configured for dragging objects.

7. The computing device of claim 1, wherein the tracking symbol graphic has an appearance corresponding to system state.

8. The computing device of claim 1, wherein the tracking symbol graphic is configured to be positioned at various positions around the mouse graphic.

9. The computing device of claim 1, wherein said tracking boundary comprises an interior tracking wall.

10. The computing device of claim 1, further comprising one of a wheel control, a ball control, a bar control, joystick, track pad, buttons, keyboard buttons, and status indicators.

11. The computing device of claim 1, further comprising:
a second mouse graphic having the appearance of a computer mouse;
at least a second button control positioned within the second graphic with a second button event being produced when activated;
a second tracking symbol graphic associated with the second mouse graphic and indicating event focus; and
a second tracking menu boundary providing tracking menu control of the interface for a second pen type input device.

12. A computing system, comprising:
a display; and
a processor configured according to a set of instructions to generate a graphical user interface to be displayed on the display, the graphical user interface including:
a mouse graphic having the appearance of a computer mouse;

at least one button control positioned within the graphic, wherein, when a pen type input device contacts the display directly above the at least one button control, the pen type input device enters into an active state, and regardless of whether the pen type input device remains in contact with the display, a function assigned to the at least one button control immediately triggers;

a tracking symbol graphic associated with the mouse graphic and indicating event focus; and a tracking menu boundary providing tracking menu control of the interface for a pen type input device, wherein the mouse graphic is moved when a cursor associated with the pen type input device encounters the tracking menu boundary.

13. A computer-implemented method, comprising:

producing, via a processor, a graphical user interface to be displayed on a display and having an appearance of a computer mouse, the graphical user interface including at least one button control positioned within the graphic;

causing a pen type input device to enter into an active state when the pen type input device contacts the display directly above the at least one button control; and causing a function assigned to the at least one button control to immediately trigger, regardless of whether the pen type input device remains in contact with the display.

* * * * *